United States Patent
Kesper (10) Patent No.: US 11,196,110 B2
(45) Date of Patent: Dec. 7, 2021

(54) TRACTION BATTERY

(71) Applicant: HOPPECKE BATTERIEN GMBH & CO. KG, Brilon (DE)

(72) Inventor: Heinrich Kesper, Willingen (DE)

(73) Assignee: Hoppecke Batterien GmbH & Co. KG, Brilon (DE)

( * ) Notice: Subject to any disclaimer, the term of this patent is extended or adjusted under 35 U.S.C. 154(b) by 185 days.

(21) Appl. No.: 16/500,333

(22) PCT Filed: Apr. 3, 2018

(86) PCT No.: PCT/EP2018/058433
§ 371 (c)(1),
(2) Date: Oct. 2, 2019

(87) PCT Pub. No.: WO2018/185074
PCT Pub. Date: Oct. 11, 2018

(65) Prior Publication Data
US 2021/0098840 A1 Apr. 1, 2021

(30) Foreign Application Priority Data

Apr. 4, 2017 (DE) ...................... 10 2017 107 203.9

(51) Int. Cl.
*H01M 10/6563* (2014.01)
*H01M 10/613* (2014.01)
(Continued)

(52) U.S. Cl.
CPC ..... *H01M 10/6563* (2015.04); *H01M 10/613* (2015.04); *H01M 10/625* (2015.04);
(Continued)

(58) Field of Classification Search
None
See application file for complete search history.

(56) References Cited

U.S. PATENT DOCUMENTS 8,383,260 B2 * 2/2013 Essinger ............. H01M 10/613
429/120
8,887,844 B2 11/2014 Chew et al.
(Continued)

FOREIGN PATENT DOCUMENTS

| DE | 7539826 U | 4/1976 |
| DE | 102010007633 A1 | 8/2011 |
| EP | 1932707 A1 | 6/2008 |

OTHER PUBLICATIONS

International Search Report (in English and German) issued in PCT/EP2018/058433, dated Jul. 9, 2018; ISA/EP.

*Primary Examiner* — Jonathan Crepeau
(74) *Attorney, Agent, or Firm* — Harness, Dickey & Pierce, P.L.C.

(57) ABSTRACT

The disclosure relates to a traction battery, comprising a plurality of battery cells which are wired to one another and which each have positive and negative electrode plates arranged alternately with one another in a cell housing, and having a plurality of battery troughs, which each accommodate a plurality of battery cells in series, each battery trough is designed to be electrolyte-resistant and electrolyte-tight, and having a battery box accommodating the battery troughs, wherein adjacent battery troughs are arranged at a distance from one another, leaving a gap space, and wherein, underneath the battery troughs, a volume space is provided, which is in fluidic connection with the gap spaces and is used as a distribution gap space for all the gap spaces, and having a forcible flow system for a cooling medium, which has a means for generating a forcible flow, which is connected to the distributor gap space, for which purpose the distributor gap space has at the inlet end thereof a connection for a cooling medium feed line.

13 Claims, 11 Drawing Sheets

(51) Int. Cl.
*H01M 10/6557* (2014.01)
*H01M 50/209* (2021.01)
*H01M 10/6555* (2014.01)
*H01M 10/625* (2014.01)
*H01M 50/249* (2021.01)

(52) U.S. Cl.
CPC ... *H01M 10/6555* (2015.04); *H01M 10/6557* (2015.04); *H01M 50/209* (2021.01); *H01M 50/249* (2021.01); *H01M 2220/20* (2013.01)

(56) References Cited

U.S. PATENT DOCUMENTS

| | | | |
|---|---|---|---|
| 2001/0030069 A1 | 10/2001 | Misu et al. | |
| 2006/0091856 A1 | 5/2006 | Lee et al. | |
| 2009/0260905 A1* | 10/2009 | Shinmura | B60L 50/64 180/68.1 |
| 2011/0192659 A1 | 8/2011 | Chew et al. | |
| 2014/0338999 A1 | 11/2014 | Fujii et al. | |
| 2015/0244036 A1* | 8/2015 | Lane | H01M 10/625 429/120 |
| 2015/0249238 A1* | 9/2015 | Andre | H01M 10/617 429/99 |
| 2015/0325891 A1* | 11/2015 | Inoue | H01M 10/6557 180/68.1 |
| 2020/0411816 A1* | 12/2020 | Yoneyama | H01M 50/249 |

* cited by examiner

TRACTION BATTERY

CROSS-REFERENCE TO RELATED APPLICATIONS

This application is a National Phase of International Application No. PCT/EP2018/058433 filed on Apr. 3, 2018. This application claims the benefit of German Patent Application No. 10 2017 107 203.9, filed on Apr. 4, 2017. The entire disclosures of the above applications are incorporated herein by reference.

FIELD

The disclosure relates to a traction battery, comprising a plurality of battery cells which are wired to one another and which each have positive and negative electrode plates arranged alternately with one another in a cell housing.

BACKGROUND

This section provides background information related to the present disclosure which is not necessarily prior art.

Traction cells of the aforementioned kind are well known per se from the prior art, which is why there is no need for separate printed proof in this place.

As non-stationary batteries, traction batteries are typically used in vehicle engineering, for instance in forklifts, lift trucks, and/or the like. Traction batteries known from the prior art comprise a plurality of battery cells which are electrically wired to one another. Depending on the desired output voltage, typically 12 cells (for 24 volt), 24 cells (for 48 volts), or 40 cells (for 80 volts) are used. Each battery cell has a cell housing receiving an electrolyte, on the one hand, and positive and negative electrode plates arranged alternately with one another, on the other hand.

The cell housing of a battery cell is typically made of plastic and is closed on the upper side by means of a lid in an electrolyte-tight manner, for instance by welding together the lid with the housing.

In order to accommodate the battery cells, a traction battery has a battery trough. This trough is usually designed without a cover in the form of a box and has a bottom and four side walls arranged thereon. When the traction battery is in a condition ready for use, the battery trough accommodates the tightly packed battery cells. The battery cells are arranged in columns and rows in order to utilise the accommodation space provided by the battery trough in an optimised manner.

The battery trough is usually formed of steel sheets welded to each other. It provides a bottom carrying the battery cells and four side walls welded to the bottom. In order to be able to deal with tolerance-related inaccuracies, the clear inside dimensions of the accommodation space provided by the battery trough are a little larger than the total dimensions of the battery cells packed tightly to form a cell package. In this manner, a continuous compensation gap is provided between the trough side walls, on the one hand, and the battery cells of the battery cell package arranged next to them, on the other hand. After the battery cells have been placed into the battery trough, spacer plates made of plastic are inserted into this compensation gap, whereby the compensation gap is closed, the battery cells are braced with respect to one another and rest against the side walls of the battery trough. The thickness of these spacer plates depends on the dimensional tolerance to be compensated.

In addition, battery arrangements have become known from the prior art which are designed as not separately manageable traction batteries. Such a battery arrangement has for instance become known from US 2014/0338999 A1, which relates to an underbody structure for an electric vehicle accommodating a battery pack. This battery pack has a battery housing consisting of a battery tray and a battery cover. In finally assembled condition, the battery tray and the battery cover are bolted to one another with a sealing element interposed. The so designed battery housing accommodates a multitude of battery modules, with each battery module containing a multitude of battery cells.

The battery tray forming the bottom of the battery housing is designed in two parts and comprises an upper plate and a lower plate, wherein the two plates are arranged at a distance from each other to form a cooling channel.

Furthermore, a cooling device is provided which draws air from outside the battery pack and supplies it to the cooling channel provided by the battery tray. The cooling channel provides two flow paths in total, each of which extends in U-shape and is guided from the rear of the underbody structure to the front of the same and back.

SUMMARY

This section provides a general summary of the disclosure, and is not a comprehensive disclosure of its full scope or all of its features.

Traction batteries of the type described above have proved themselves in daily practical use. Nevertheless, there are attempts for improvement, in particular in order to extend the scope of application. It is therefore the object of the disclosure to provide a novel traction battery enabling an extended scope of application.

In order to achieve this object, the disclosure proposes a traction battery, comprising a plurality of battery cells which are wired to one another and which each have positive and negative electrode plates arranged alternately with one another in a cell housing, and having a plurality of battery troughs, which each accommodate a plurality of battery cells in series, each battery trough is designed to be electrolyte-resistant and electrolyte-tight, and having a battery box accommodating the battery troughs, wherein adjacent battery troughs are arranged at a distance from one another, leaving a gap space, and wherein, underneath the battery troughs, a volume space is provided, which is in fluidic connection with the gap spaces and is used as a distribution gap space for all the gap spaces, and having a forcible flow system for a cooling medium, which has a means for generating a forcible flow, which is connected to the distributor gap space, for which purpose the distributor gap space has at the inlet end thereof a connection for a cooling medium feed line.

The basis of the disclosure is a traction battery with a plurality of battery cells which are wired to one another and which each have positive and negative electrode plates arranged alternately with one another in a cell housing, and with a plurality of battery troughs, which each accommodate a plurality of battery cells, wherein each battery trough is designed to be electrolyte-resistant and electrolyte-tight, and with a battery box accommodating the battery troughs, wherein adjacent battery troughs are arranged at a distance from one another, leaving a gap space.

Breaking with the previous design according to the prior art, the embodiment according to the disclosure not longer only provides a battery trough which accommodates all battery cells of the traction battery in a tightly packed manner. A plurality of battery troughs is rather provided which, in finally assembled condition, are accommodated by a common battery box. Adjacent battery troughs are arranged at a distance from one another, leaving a gap space.

Each of the battery troughs accommodates a series of battery cells arranged one after another, so that the embodiment according to the disclosure causes that the battery cells are flow-washed by a cooling medium, for instance air, at least on two sides.

The gap spaces provided by the embodiment according to the disclosure make it possible to remove heat by air circulation in appropriate operating condition. In this manner, it is possible to keep the operating temperature at a low level in comparison to a conventionally compact cell packing. This in turn permits the use of the traction battery according to the disclosure also for high-current applications without significant losses with respect to service life. Owing to the embodiment according to the disclosure, the scope of application is thereby extended.

A "high current application" within the meaning of the disclosure is the input and/or output of high currents within a short period, whether in the case of discharging by operation of e.g. AC motors, or in the case of charging by the use of e.g. modern charge management systems and/or energy recovery facilities (recuperation). With increasing size of the individual battery cells, the input and/or output of high currents leads to more important unavoidable undesirable side effects, such as e.g. the generation of heat due to the internal resistance which increases with the increasing cell size. In a disadvantageous manner, this leads to a shorter service life and shorter discharge cycles when used. As a consequence, starting from a particular size, traction batteries known from the prior art are not or only partly suitable for high-current applications, which is true in particular for traction batteries of the size demanded in the market because of the desired high capacity. Therefore, there are the conflicting requirements to create a battery which either provides a high capacity or is suitable for high-current applications, while it has a long service life at the same time. Generic batteries per se do not meet this requirement.

Examinations carried out by the applicant have shown that depending on the size and the accompanying internal resistance, traction batteries known from the prior art used in high-current applications may get as hot as 60° C. and more, in particular during charging. Typically, though, traction batteries known from the prior art are only designed for an average temperature level of e.g. 30° C. As a result, the high-current application leads to a significant shortening of the battery service life due to the accompanying thermal stress.

In order to protect the battery, a cooling phase must be provided by the user after heating due to a high-current application by e.g. a charging process before another high-current application can be started. Depending on the size and the temperature level reached, however, such a cooling phase may take several days, which is disadvantageous not only from an economic point of view, but also downtimes and change-over times must be taken into account and compensated by redundant equipment.

The embodiment according to the disclosure overcomes the disadvantages described above and enables an application in the high-current range without a significant shortening of the overall service life.

According to the disclosure, it is provided that the traction battery comprises a forcible flow system for a cooling medium.

Within the meaning of the present disclosure, this means that an air flow is generated which is caused not simply by the thermal conditions in the gap spaces, i.e. a pure convection current, but that a forcible flow is generated by fans, pumps, or the like, so that the respective cooling medium, for instance air, is pressed or sucked through the gap spaces.

What is therefore proposed is a traction battery with a plurality of battery cells which are wired to one another and which each have positive and negative electrode plates arranged alternately with one another in a cell housing, and with a plurality of battery troughs, which each accommodate a plurality of battery cells, wherein each battery trough is designed to be electrolyte-resistant and electrolyte-tight, and with a battery box accommodating the battery troughs, wherein adjacent battery troughs are arranged at a distance from one another, leaving a gap space, and with a forcible flow system for a cooling medium.

Cooling media may also be others than air, and they may be gaseous or liquid. Within the scope of the disclosure, they may be pre-tempered in order to be able to perform purposeful and controllable cooling cycles.

According to the disclosure, a volume space is provided underneath the battery troughs. This volume space is in fluidic connection with the gap spaces formed between adjacent battery troughs. In this manner, a continuous cooling medium space is created which consists of the gap spaces formed between the battery troughs, on the one hand, and the volume space fluidically connecting the gap spaces, on the other hand. The volume space provided underneath the battery troughs serves as a distributor gap space for all gap spaces fluidically connected to it. When used appropriately, a cooling medium can therefore be introduced into the distributor gap space, which is then distributed from there to the fluidically connected gap spaces.

According to the disclosure, furthermore a means for generating a forcible flow is provided. This means may for instance be a fan which conveys ambient air as a cooling medium.

The means for generating a forcible flow can be connected to the distributor gap space. For this purpose, it is provided that the distributor gap space has a connection for a cooling medium feed line at its inlet end. When used appropriately, the means for generating a forcible flow can cause a supply of cooling medium which gets to the distributor gap space via the connection provided at the inlet end of the distributor gap space, and from there to the gap spaces between the battery troughs. As a result, the battery troughs, and thereby the battery cells accommodated in series therein, will be flow-washed by cooling medium both from underneath and also with respect to their large sides. This will finally lead to an accelerated heat discharge.

Instead of a cooling medium feed line, also a cooling medium drain line may be provided, in which case not pressurised air, but a draught is generated by a fan. In this case, the flow path is reversed, and air is drawn in via the gap spaces which are open at the top and from there reaches the distributor gap space, from where it is then sucked out by means of the fan.

In this context, a system is further proposed which comprises a plurality of traction batteries of the kind described above and a means for generating a forcible flow of the kind described above, wherein the traction batteries may optionally be fluidically connected to the means for generating a forcible flow. Such a system permits the appropriate use of a traction battery, wherein at the same time, a traction battery discharged by prior appropriate use is charged and simultaneously cooled in the manner already described above by using the means for generating a forcible flow. As a result, owing to the embodiment according to the disclosure, the traction battery to be charged will be available again for appropriate use much sooner.

Fans may be arranged also immediately in the area of the gap spaces. It is also possible to fluidically connect several gap spaces to one another, so that fans or pumps may be arranged at a suitable place.

According to a particularly advantageous proposal of the disclosure, a bottom gap space is formed on the bottom side. For this purpose, the battery box is provided with a double bottom which is fluidically connected with respect to the gap spaces formed between the battery troughs. So according to the disclosure, it may serve as a distributor gap space for distributing the cooling medium to all gap spaces.

According to another advantageous proposal of the disclosure, the bottom gap space or another distributor gap space has different flow cross-sections in longitudinal flow direction. In this manner, it may for instance be ensured that all other gap spaces connected to the respective gap space are evenly supplied with cooling medium.

If one of the gap spaces is provided with an interface to connect an external flow source, it is proposed according to the disclosure that the interface is slot-shaped. In this case, the overall system comprises a flow source to be externally connected to the battery box, for instance a fan.

Alternatively, or also additionally, fans may be arranged in different suitable places within the battery box.

Due to the spaced arrangement of the battery troughs, a ventilation system is created which allows cooling, for instance by air circulation. In this manner, the temperature level reached during operation can be lowered, on the one hand, and it is possible to enable a distinctly shortened cooling period in comparison with the prior art, on the other hand, which may take only a few hours and not possibly days. This advantage matters in particular after a traction battery has been charged appropriately. This is the case because the cooling time is clearly reduced after an appropriate charging process, on the one hand, and also because the traction battery according to the disclosure can be integrated into standard conventional charging and discharging cycles, on the other hand, without running the risk of longer-lasting overheating, so that a distinctly extended service life is achieved.

According to a preferred embodiment of the disclosure, it is provided that the distributor gap space is delimited by a bottom plate arranged at a distance to the battery troughs, as already described above. In this case, it is preferable to arrange spacers between the battery troughs and the bottom plate. These spacers ensure an exact spacing of the bottom plate to the undersides of the battery troughs.

The spacers are preferably webs extending transversely to the longitudinal orientation of the battery troughs. These webs are for instance welded to the undersides of the battery troughs. The bottom plate in turn is connected to the spacers, for instance by welding. The side walls forming the battery box can be pulled downwards in direction of height so far that the bottom plate and the spacers are visually covered.

According to another feature of the disclosure, it is provided that the distributor gap space comprises a flow cross-section which is continuously tapering from the inlet end to the opposite end. This embodiment has the advantage that as a consequence of a cooling medium flowing off through the gap spaces between the battery troughs, which gap spaces are connected to the distributor gap space, there is no pressure loss within the distributor gap space. Therefore, this construction ensures that the cooling medium is delivered with the same pressure load to all gap spaces fluidically connected to the distributor gap space.

According to another feature of the disclosure, it is provided that the means for generating a forcible flow comprises a fan. This embodiment is particularly preferable where ambient air is used as a cooling medium.

The fan preferably has a housing. According to another feature of the disclosure, this housing is equipped with an outlet slot which is formed corresponding to the connection of the inlet end of the distributor gap space. In the case of cooling, the housing can be fluidically connected to the traction battery, so that cooling air conveyed by the fan can reach the distributor gap space and the gap spaces fluidically connected thereto via the fan housing through the outlet slot and the connection on the distributor gap space side.

According to another feature of the disclosure, the fan comprises a radial-flow impeller. Therefore, a radial-flow fan is used. The radial-flow fan is advantageous in particular in that it can generate with certainty the pressure build-up within the supplied cooling medium required for a desired cooling of the battery cells. Moreover, this results in a compact design, since the cooling air can be sucked in perpendicularly to the direction of the outlet flow.

Alternatively to a radial-flow fan, an axial-flow fan can be used, i.e. a fan with an axial-flow impeller. The advantage of this embodiment is that by means of the fan, suction can occur, in which case the cooling air is not pressed into the distributor gap space, but the air present there is sucked off, so that via the gap spaces fluidically connected to the distributor gap space, the air that follows flows through the gap spaces and the distributor gap space as cooling air.

The embodiment according to the disclosure serves in particular to cause battery cells to be cooled when the traction battery is recharged after a prior discharge. So during a charging process, a cooling medium is supplied to the traction battery in order to flow-wash the battery troughs, so that heat is discharged, and as a result of that, the traction battery is ready for use sooner after completion of an appropriate recharging process. Therefore, also a sensor system is proposed with the disclosure causing an automatic activation of the means for generating a forcible flow when the traction battery is fluidically connected to the means for generating a forcible flow.

According to a first proposal it is proposed in this context that proximity sensors are provided which detect a connection of the traction battery to the means for generating a forcible flow. As soon as such a detection has occurred, i.e. a traction battery connected to the means for generating a forcible flow has been detected, the means for generating a forcible flow is automatically activated. Such a sensor detection can also be combined with a time control which makes it possible to automatically switch off the means for generating a forcible flow when a predeterminable operating interval has been completed.

Such a time control can also provide an intermittent interval control, that means a repeated activation and switching-off of the means for generating a forcible flow until an appropriate cooling of the entire traction battery has been achieved. Such an intermittent operation has the advantage that the overall efficiency of the system can be improved, because the energy required for cooling a traction battery can be optimised in this manner.

According to an alternative embodiment, a sensor is provided which is arranged on the charging cable between the charging device and the traction battery. This sensor detects a current flow through the charging cable, whereby the means for generating a forcible flow is activated upon the start of the actual charging process.

This current flow detection sensor is not arranged within the charging cable, but it is attached from the outside to the charging cable as a separately formed sensor. The advantage of this is that also already existing systems can be retrofitted in a simple manner.

The battery troughs according to the disclosure are designed to be electrolyte-resistant and electrolyte-tight. "Electrolyte-resistant" within the meaning of the disclosure means that the inner surface of the battery troughs is resistant to the chemical effect of the electrolytes accommodated by the battery cells. "Electrolyte-tight" within the meaning of the disclosure means that in the event of a leaking from a defective battery cell housing, electrolyte will be safely retained by the battery trough and can therefore not reach the surroundings of the traction battery, provided, of course, that the traction battery is appropriately oriented and is not improperly tilted or even overturned.

By the embodiment according to the disclosure, the synergetic effect is achieved that an air circulation between adjacent battery cells is permitted, on the one hand, but also leakage protection for electrolyte possibly leaking from a battery cell is provided, on the other hand. According to the disclosure, this synergetic effect is achieved by providing a separate electrolyte-resistant and electrolyte-tight battery trough for each cell row. Several such troughs loaded with battery cells are arranged adjacent with respect to each other, leaving a gap space, thereby creating the ventilation system. For a positionally secure arrangement of these battery troughs, a common battery box is provided which accommodates the individual battery troughs. It is provided that the lower end edge of the battery troughs is arranged in direction of height above the lower end edge of the battery box, so that underneath the battery troughs, a volume space is created as already described above, which enables a supply of cold air which then can flow into the gap spaces between the battery troughs which gap spaces are fluidically connected with the volume space.

The battery trough of generic traction batteries is designed in a standardised manner with respect to its geometric dimensions. The purpose of this is to ensure that the battery trough accommodating the battery cells will fit appropriately into the accommodation spaces provided for it in battery-operated devices, as in particular vehicles. The battery box provided by the embodiment according to the disclosure has these standard dimensions known from the prior art of a battery trough of a traction battery known from the prior art. This ensures that it is possible to appropriately insert also the traction battery according to the disclosure into the accommodation spaces, in particular of vehicles, provided for it.

In order to be able to provide the gap spaces as described above between adjacent battery troughs despite the unchanged external dimensions of the traction battery, the embodiment according to the disclosure proposes that the inserted battery cells comprise one pair less of electrode plates per battery cell than the battery cells typically used according to the prior art. So according to the prior art, typically 8 so-called HPzS cells are used, which means that 8 positive electrode plates and 9 negative electrode plates per battery cell are provided. According to the disclosure, 7 HPzS battery cells are used in contrast to the prior art described above, therefore battery cells which only comprise 7 positive and 8 negative electrode plates. In this manner, two electrode plates, i.e. one pair of electrode plates, are/is dispensed with per battery cell in direction of width of the traction batteries. By this saving, the space required to form the gap spaces between adjacent battery troughs is created, while the external dimensions of the traction battery remain the same.

The reduction of the plate pairs entails a reduction of the battery capacity. This in turn leads to a reduction of the current discharge rate, and therefore finally of the withdrawal time. This disadvantage is consciously accepted, since in practical application, it is not only the discharge time, but the overall cycle composed of discharging time and charging time that matters. Since the gap spaces provided according to the disclosure allow a distinctly quicker cooling of the traction battery, in particular subsequent to a charging process, an overall examination shows that the overall cycle as a whole has been optimised and designed clearly more effectively in favour of the user. Examinations performed by the applicant have shown that as a result of the reduction of the number of electrode plates, the discharging time is reduced by 15 min on the average, while the cooling time after charging is reduced by approx. 11 hours, resulting in a saving of more than 10 hours in favour of the user, when considering the overall cycle. That means that the design according to the disclosure causes in particular that the change-over times are reduced substantially, which has the additional advantage that less redundant devices have to be provided.

The temperature build-up in the case of withdrawal of electricity depends in particular on the electric resistance of the traction battery. Therefore, it is proposed with the disclosure to reduce the internal electric resistance of the traction battery by designing the current-dissipating components, i.e. the cell terminals, in an optimised manner with regard to a reduced internal resistance. This is achieved in particular by designing their geometric dimensions much smaller in comparison with the prior art. By this measure, a reduced temperature build-up is achieved, which compensates at least partly for the reduced capacity by the reduced number of electrode plates. On the whole, an optimised system for a traction battery is provided thereby which is suitable in an optimised manner for high-current applications.

Both the battery troughs and the battery box are made of metal, permitting to weld the battery troughs and the battery box together with one another. In this manner, a tight closure on the front face end of the battery troughs is achieved, resulting in electrolyte tightness.

The use of metal as a material both for the battery troughs and for the battery box is advantageous also for another reason. Metal as a material serves as an optimised heat conductor, which is of particular advantage for cooling purposes. Cooling air passing the metal walls leads to an areal cooling of the flooded metal surfaces, so that an optimised heat withdrawal is ensured, which in turn leads to an optimised cooling of the battery cells accommodated by the battery troughs.

According to another feature of the disclosure, it is provided that not only adjacent battery troughs are arranged at a distance from one another, but also the battery troughs adjacent to a side wall of the battery box are arranged at a distance from the respective allocated side wall. Thereby, a corresponding gap space is formed also between a battery trough and the side wall of the battery box arranged at a distance thereto. According to this alternative design, all of the battery troughs accommodated by the battery box are therefore flow-washed by air with respect to two of their sides.

Further areas of applicability will become apparent from the description provided herein. The description and specific examples in this summary are intended for purposes of illustration only and are not intended to limit the scope of the pre-sent disclosure.

DRAWINGS

The drawings described herein are for illustrative purposes only of selected embodiments and not all possible implementations, and are not intended to limit the scope of the present disclosure.

Other features and advantages of the disclosure can be gathered from the following description on the basis of the figures. In these figures:

FIG. 7 shows a top view of a traction battery according to the prior art according to FIG. 6;

Corresponding reference numerals indicate corresponding parts throughout the several views of the drawings.

DETAILED DESCRIPTION

Example embodiments will now be described more fully with reference to the accompanying drawings.

Figure 6:
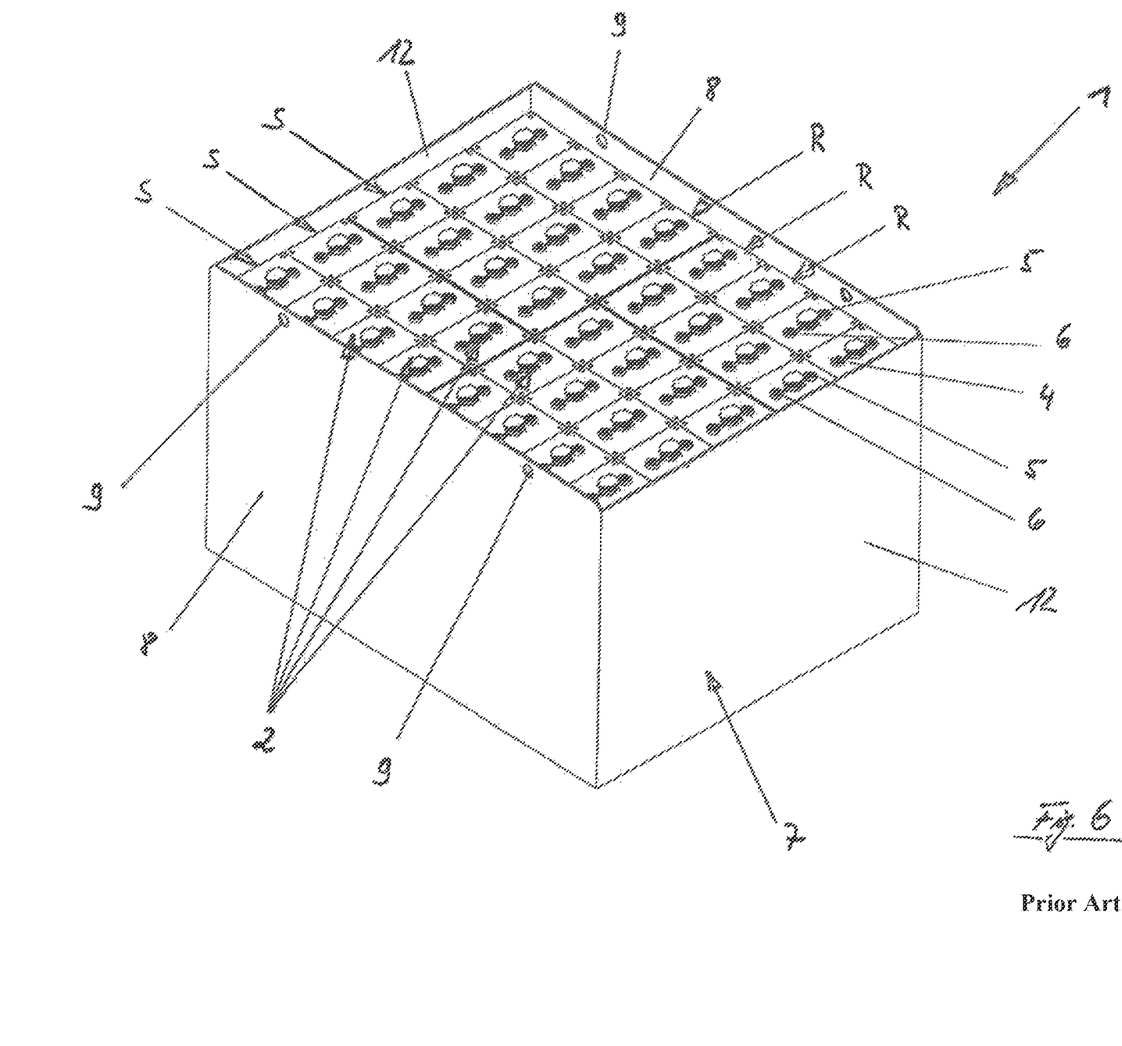
FIG. 6 shows a schematic view of a traction battery according to the prior art.

The FIGS. 6 and 7 show a traction battery according to the prior art. A traction battery 1 according to the disclosure is shown in FIGS. 1 through 4.

According to FIG. 6, a traction battery 1 according to the prior art comprises a battery trough 7. The latter is formed housing-like in the form of a box and has four side walls 8 and 12, respectively, and a closed bottom not recognisable in detail in FIG. 6. For handling the traction battery 1, for instance by means of a lifting gear, each of the side walls 8 has recesses 9 on its upper edge where for instance lifting hooks can be engaged.

The battery trough 7 serves to accommodate a plurality of battery cells 2, which are arranged tightly packed within the battery trough 7 and are grouped to form rows R and columns S.

Each battery cell 2 comprises, in a manner known per se, positive and negative electrode plates not shown in detail in the figures, which are arranged alternately with one another within a cell housing not shown in detail. In addition, the cell housing accommodates an electrolyte which, in finally assembled condition, flow-washes the electrode plates. On the upper side, each of the cell housings is closed in an electrolyte-tight manner by means of a cell lid 4, for instance by welding.

A negative terminal 6 and a positive terminal 5 are led through each of the cell lids 4. In finally assembled condition, the battery cells 2 are electrically wired to one another via their terminals 5 and 6, which wiring is not shown in detail in the figures for reasons of clarity.

For reinforcement of the battery trough 7, partition walls 11 may be provided, as can be seen in particular from the representation in FIG. 7.

Furthermore, it can be seen in FIG. 7 that the battery cells 2 are tightly packed and rest against each other. In this manner, the accommodation space provided by battery trough 7 is utilised in an optimised manner.

Between the side walls 8 and 12, respectively, and the battery cells 2 provided adjacent to the side walls 8 and 12, an overall continuous compensation gap 10 is provided, as can also be seen most clearly from FIG. 7. This compensation gap 10 serves as a tolerance compensation and ensures that even with a maximally possible tolerance deviation, the internal dimensions of the battery trough 7 are at least of a size that battery trough 7 can indeed accommodate the number of battery cells 2 provided for battery trough 7. For a positionally stable packing of the battery cells 2, spacer plates made of plastic are inserted into compensation gap 10 after the battery cells 2 have been inserted. The compensation gap 10 is therefore closed, and the battery cells 2 in finally assembled condition rest against the respective associated side walls 8 and 12 of battery trough 7, with the compensation plates interposed. For reasons of clarity, these compensation or spacer plates are not shown in detail in the figures.

Figure 1:
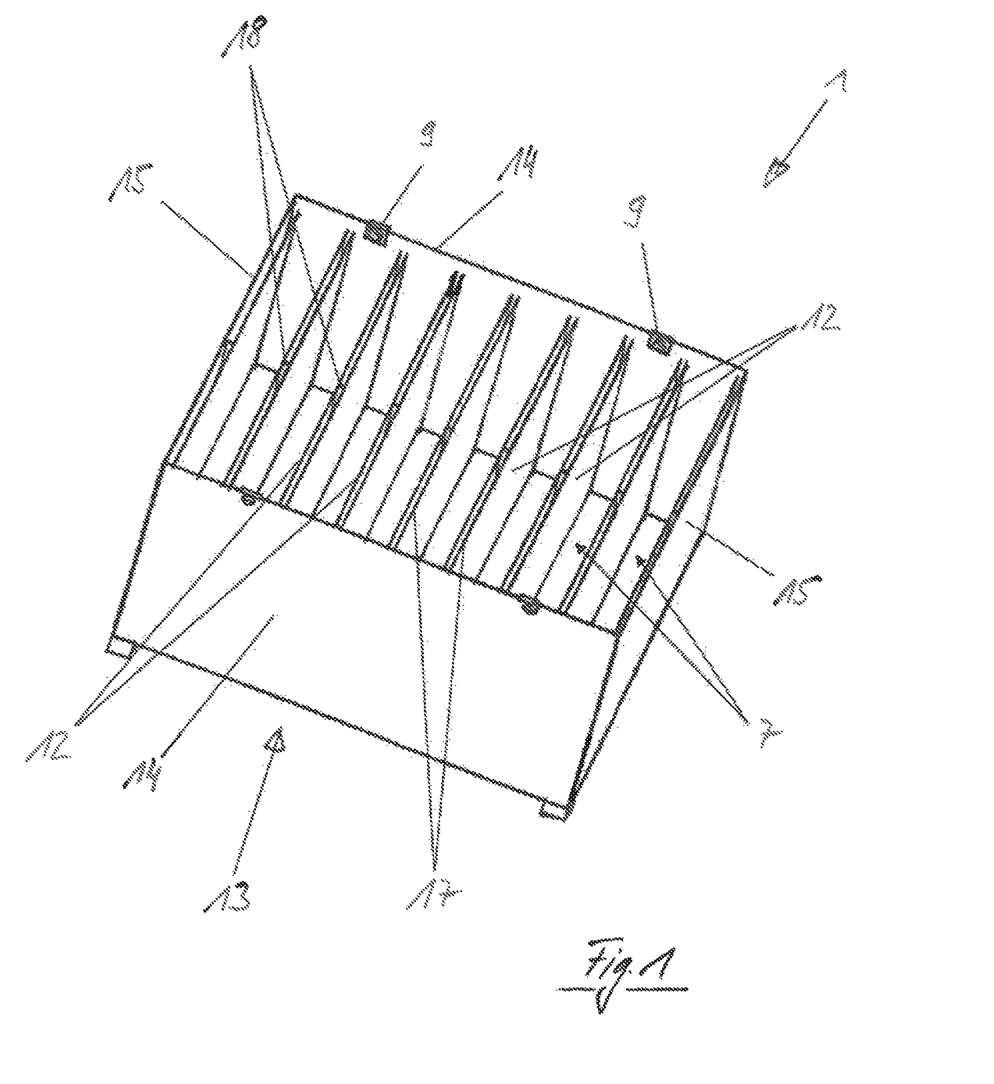
FIG. 1 shows a schematic perspective view of a traction battery according to the disclosure.
Figure 2:
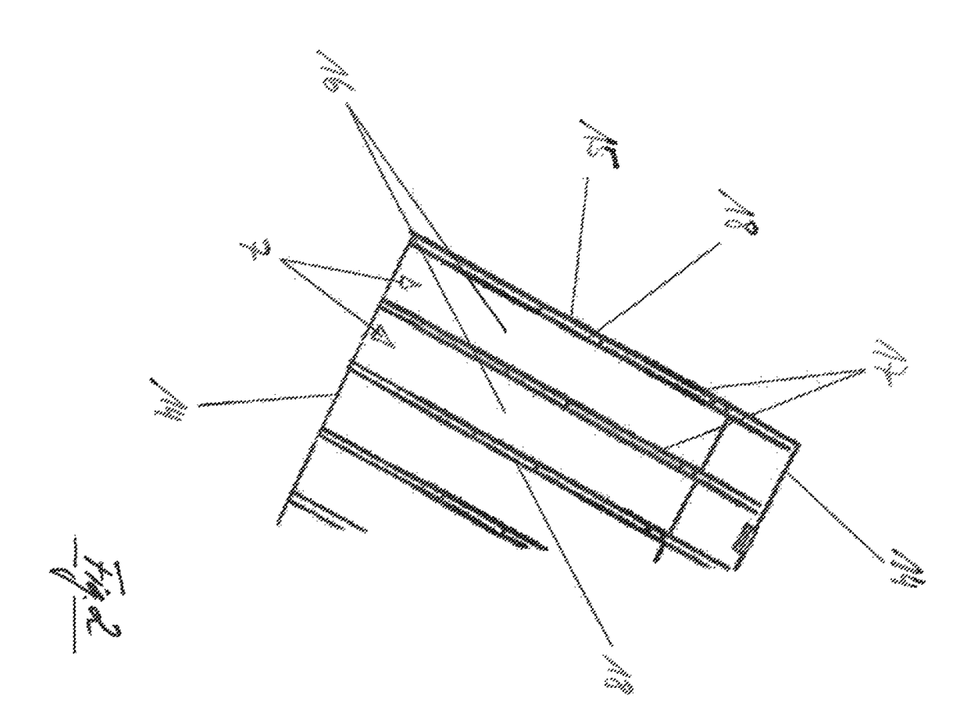
FIG. 2 shows a detailed view of the traction battery according to FIG. 1.

A traction battery 1 according to the disclosure is shown in FIGS. 1 and 2, with the battery cells 2 not being shown for reasons of clarity.

According to the embodiment according to the disclosure, several battery troughs 7 are used, wherein each battery trough 7 serves to accommodate a series of battery cells 2. Each of the battery troughs 7 is designed to be electrolyte-resistant and electrolyte-tight.

The traction battery 1 according to the disclosure further comprises a battery box 13. This battery box 13 accommodates the individual battery troughs 7, wherein adjacent battery troughs 7 are arranged at a distance from one another, leaving a gap space 17.

As can be seen in particular from the detailed representation in FIG. 2, battery box 13 comprises first side walls 14 and second side walls 15. The side walls 15 of battery box 13 extend in longitudinal direction of the battery troughs 7.

The battery troughs 7 adjacent to the side walls 15 of battery box 13 are arranged adjacent to the side walls 15, leaving a gap space 17. As a result, each battery trough 7 is flow-washed by air with respect to its two large side walls 12.

For reinforcement of the entire structure, it is provided that the gap spaces 17 both between two adjacent battery troughs 7 and between a battery trough and a side wall 15 of the battery box 13, which side wall 15 is adjacent to the battery trough, accommodate a spacer 18. Both the battery troughs 7 and the battery box 13 are made of metal and welded together with one another. Also the spacers 18 preferably consist of metal and are welded together with the battery troughs 7 and the associated side walls 15 of battery box 13.

Figure 3:
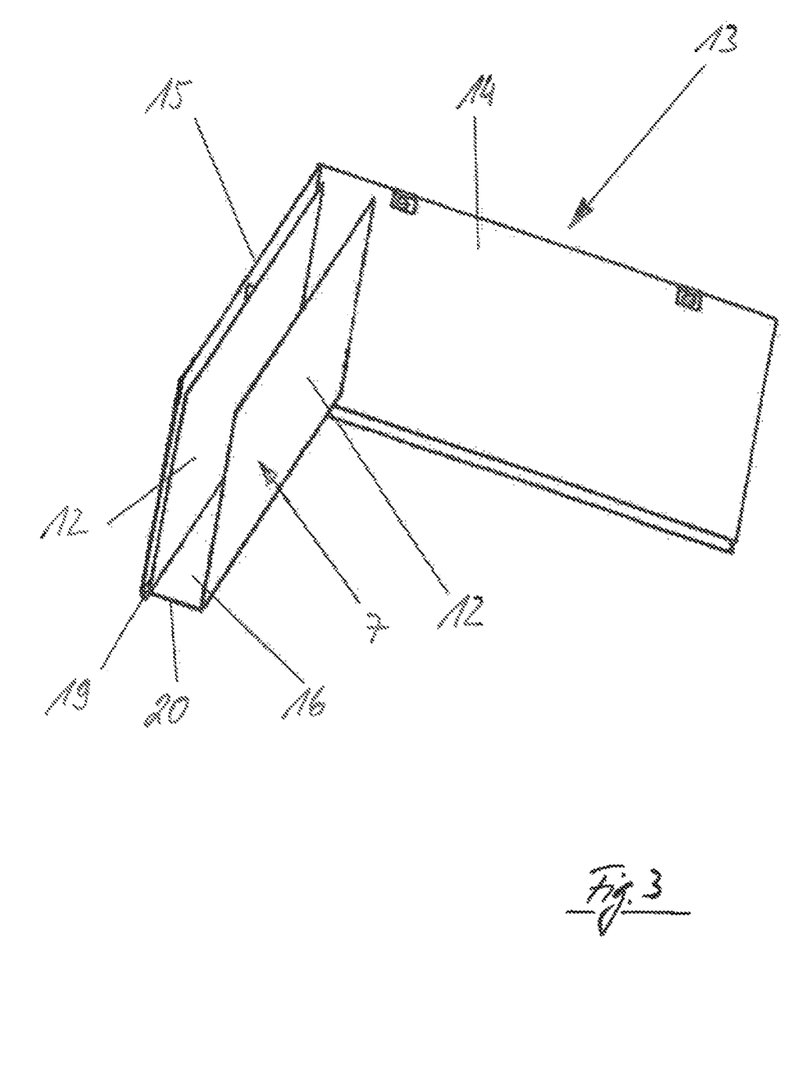
FIG. 3 shows another detailed view of the traction battery according to the disclosure according to FIG. 1.

As can be gathered in particular from the representation in FIG. 3, a battery trough 7 is formed as a U profile closed on the front face end. The front face ends are closed by the side wall 14 of battery box 13 associated to each front face. In this manner, a particularly simple design is provided, since no additional components are required to close the U profiles on the front face end.

Figure 4:
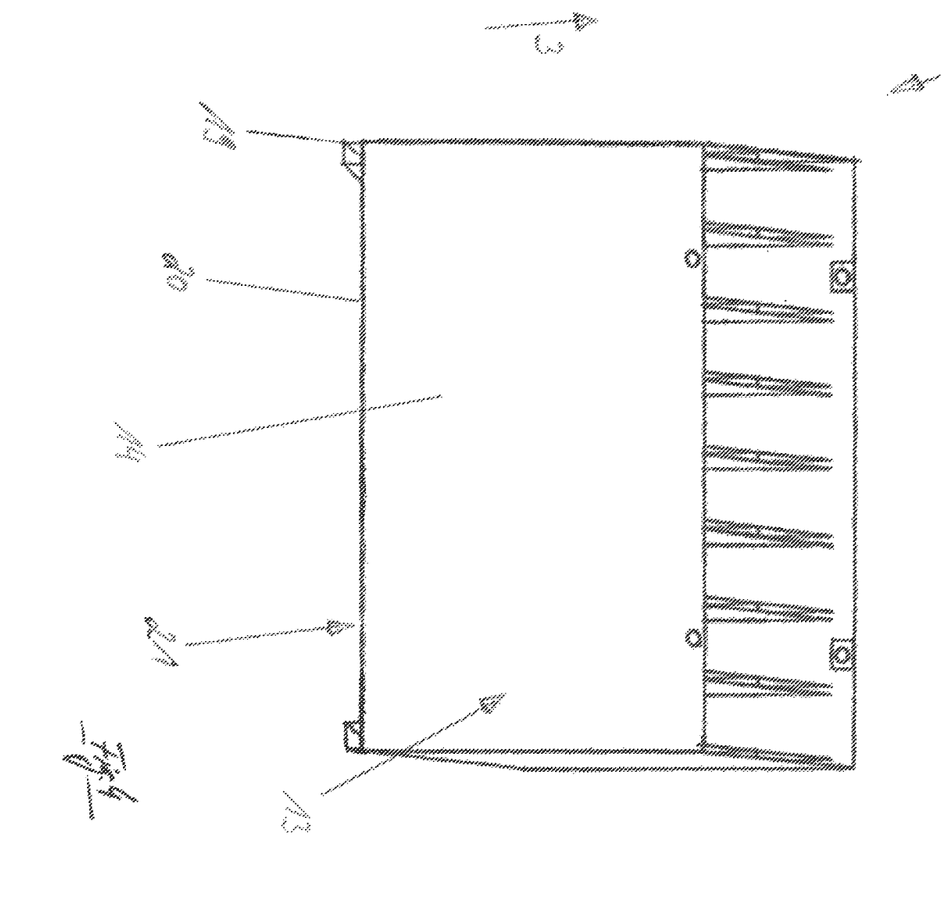
FIG. 4 shows another perspective representation of the traction battery according to the disclosure.

It can also be gathered in particular from FIG. 4 that the lower end edge 19 of battery box 13 is arranged in direction of height 3 underneath the lower end edges 20 of the battery troughs 7. In this manner, a volume space is created underneath the battery troughs 7, which volume space is accessible via gap 21 provided on the front face ends of the battery troughs 7. The volume space in turn is fluidically connected with the gap spaces 17, so that when used appropriately, air can circulate through gap 21 into the volume space and from there through the gap spaces 17 upwards in direction of height 3. In this manner, an effective cooling of the side walls 12 delimiting the battery troughs 7 is achieved, which leads to an effective heat dissipation and thereby to a cooling of the battery cells 2 accommodated by the battery troughs 7.

Figure 5:
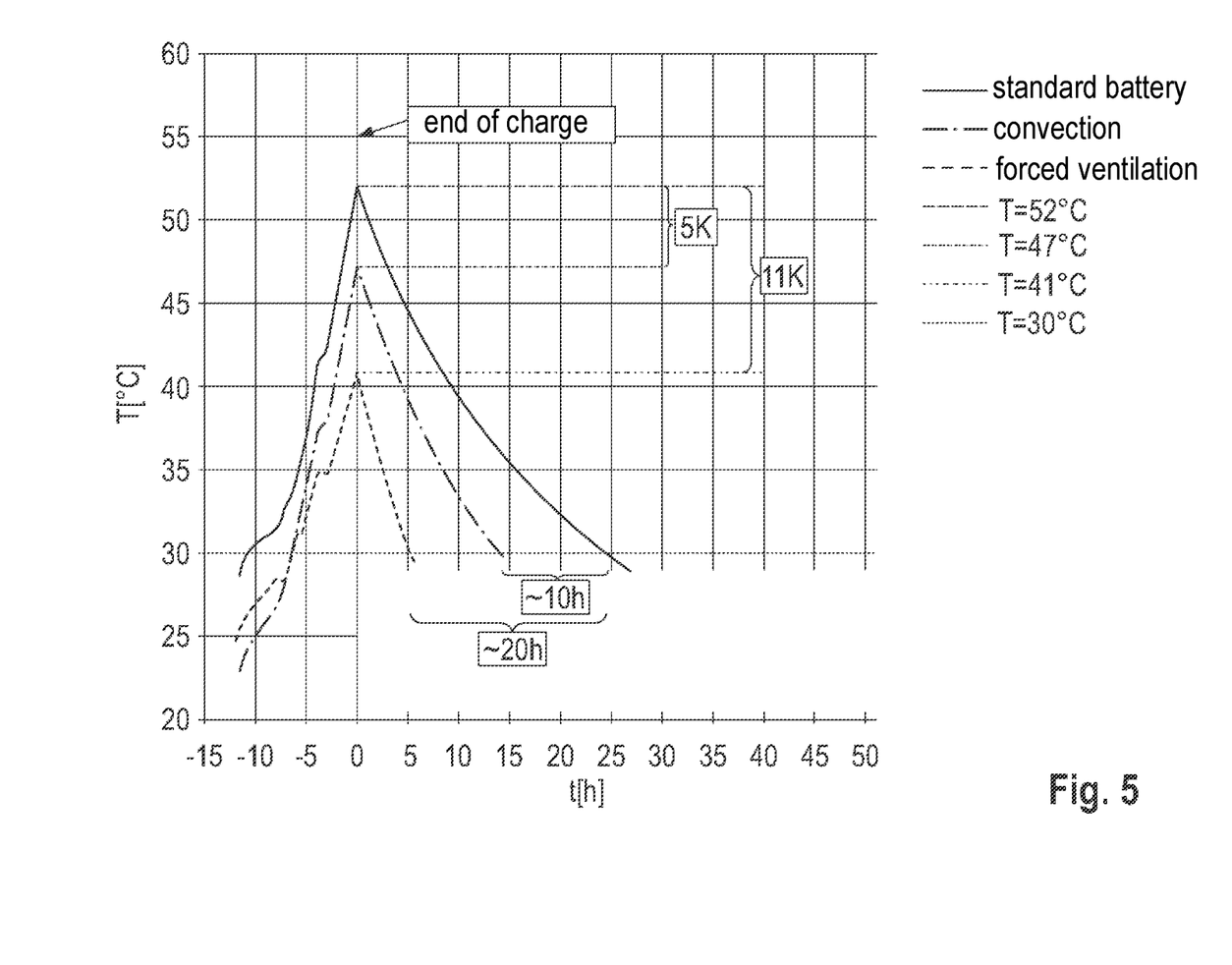
FIG. 5 shows a graph about the cooling behaviour of a traction battery according to the disclosure.

In FIG. 5, the cooling behaviour of a traction battery 1 according to the prior art can be seen on the basis of a graph in the form of the solid line. A traction battery with a convection current is represented as a dash-dot line. The cooling behaviour of a traction battery supplied with a forcible flow is shown in the dashed line.

In the graph, temperature is plotted against time in hours for cooling.

As can be seen from the graph, a traction battery 1 heated to e.g. 52° C. as a result of a prior charging process requires a certain cooling period for cooling down to an operating temperature of approx. 30° C. A traction battery according to the prior art requires a cooling period of approx. 24 hours, whereas a traction battery with convection current has cooled down already after approx. 14 hours, resulting in a saving of time of approx. 10 hours. A traction battery with convection current, however, requires a cooling time of about 5 hours, resulting in a saving of time of almost 20 hours. This shows a particularly advantageous effect of the disclosure.

It can further be gathered from the graph according to FIG. 5 that in the exemplary embodiment shown, the charging of traction battery 1 takes about 12 hours. The charging process is finished at the time t=0. As can be seen clearly from the individual lines of the graph, as a result of cooling of traction battery 1 already at the beginning of the charging process, a correspondingly reduced temperature is achieved at the time of the end of the charging process. Without cooling, traction battery 1 will have a temperature of approx. 52° C., whereas with cooling according to the disclosure, the temperature at the end of the charging process will be only 41° C.

After completion of the charging process, cooling will be continued in the manner already described above. Not least because of the reduced temperature at the end of the charging process, a shortening of approx. 20 hours is achieved with respect to traction battery 1 cooled according to the disclosure in comparison with the standard traction battery. Therefore, cooling according to the disclosure has two effects. On the one hand, the battery cools down faster after completion of charging. On the other hand, also the temperature at the end of charging is a lot lower if it is already cooled according to the disclosure during charging. So the temperature difference at the end of charging achieved in the shown exemplary embodiment is 11° C. between the traction battery cooled according to the disclosure and the standard battery.

The battery box 13 according to the embodiment according to the disclosure preferably comprises standardised standard dimensions in the directions of height, width, and length. This ensures that the traction battery according to the disclosure can be accommodated in standard accommodation spaces of e.g. electric vehicles, charge management systems, and the like.

In order to provide a battery box 13 with standard dimensions, on the one hand, which provides sufficient space for forming both the gap spaces 17 between the battery troughs 7 and the volume space underneath the battery troughs 7, on the other hand, the following measures have been taken with the embodiment according to the disclosure. The battery cells 2 used in relation to a certain standard size of battery box 13 are reduced in size in direction of width by using battery cells 2 which have one pair of electrode plates less in comparison with maximum packing. In this manner, sufficient space is created in direction of width of battery box 13 to form the gap spaces 17 described above between adjacent battery troughs 7, on the one hand, and battery troughs 7 and adjacent side walls 15 of battery box 13, on the other hand. By this structural measure, the disadvantage of a reduced overall battery capacity in comparison with a maximally possible battery capacity according to prior art with a given trough size is deliberately accepted. This deliberately accepted disadvantage, however, is more than compensated by the quicker reusability concomitant with the cooling possible due to the embodiment according to the disclosure. This is because due to the cooling concomitant with the embodiment according to the disclosure, in particular the regeneration period after a charging process is much shorter than in traction batteries according to the prior art, as has already been described above based on FIG. 5.

In order to comply with the standard size of battery box 13 in direction of height 3, the battery cells 2 are shortened in direction of height in comparison with the prior art. This is achieved in that the additional volume for electrolyte liquid available above the electrode plates is designed smaller, which results in a reduced height of the battery cells. The reduction in size of the additional volume for electrolyte liquid has the disadvantage that the maintenance intervals are shorter, but also this disadvantage is deliberately accepted, especially since in the prior art, electrolyte refill devices are known which operate automatically, so that maintenance work can be omitted when such systems are used. In any case, the reduction in height of the battery cells 2 has the advantage that the battery box 13 can be designed in such a way that a volume space is created underneath the battery troughs 7. This volume space serves to distribute fresh air supplied from outside to the individual gap spaces 17 between the battery troughs 7 and between the battery troughs 7 and adjacent side walls 15 of battery box 13, respectively.

Figure 8:
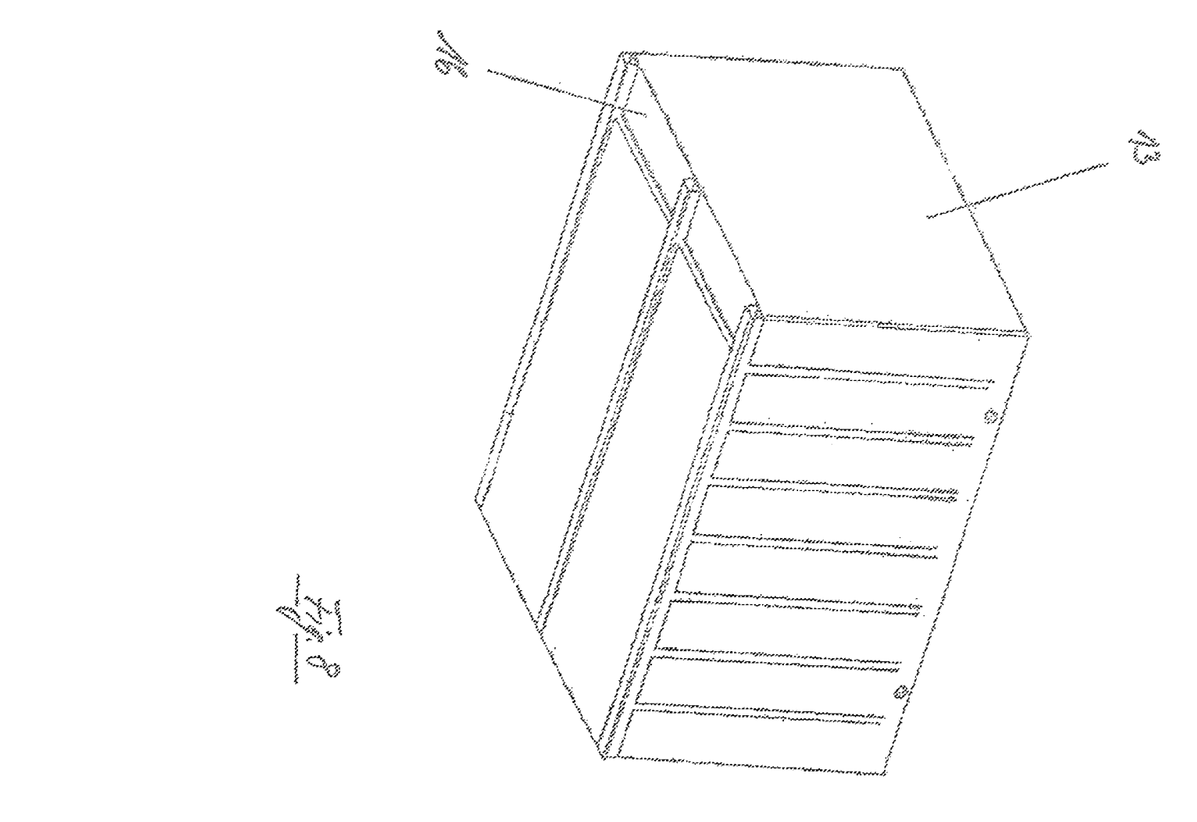
FIG. 8 shows a perspective representation of an exemplary embodiment of a battery box according to the disclosure.
Figure 9:
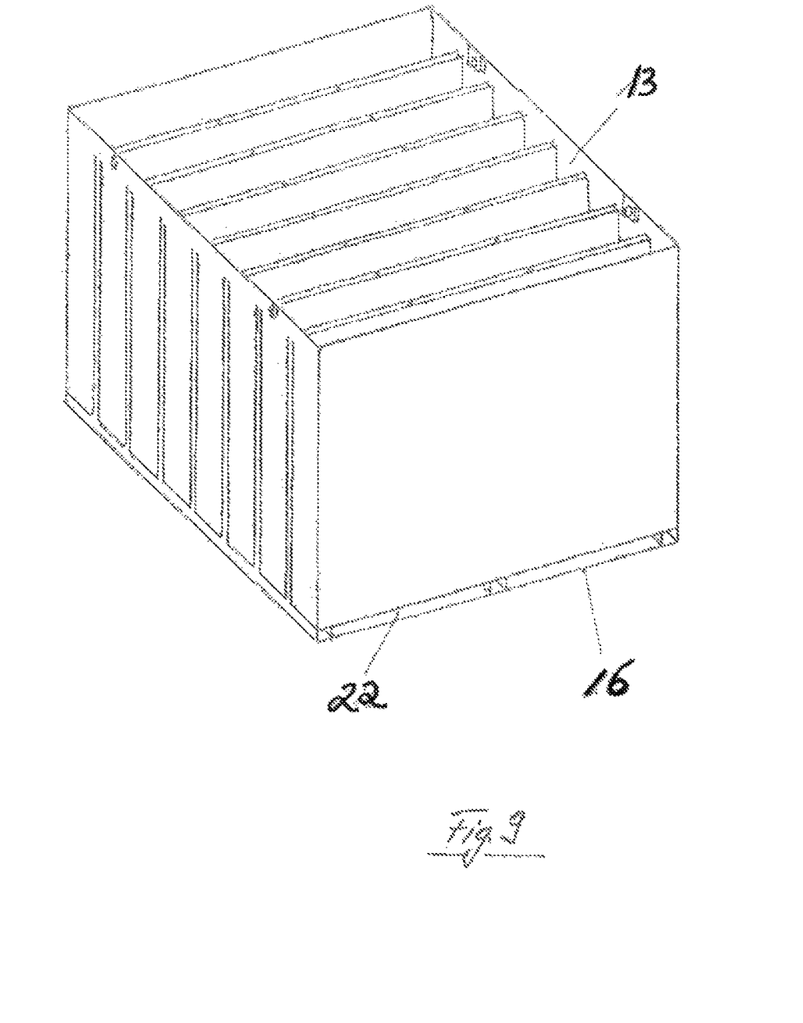
FIG. 9 shows a perspective front view of the battery box according to FIG. 8.
Figure 10:
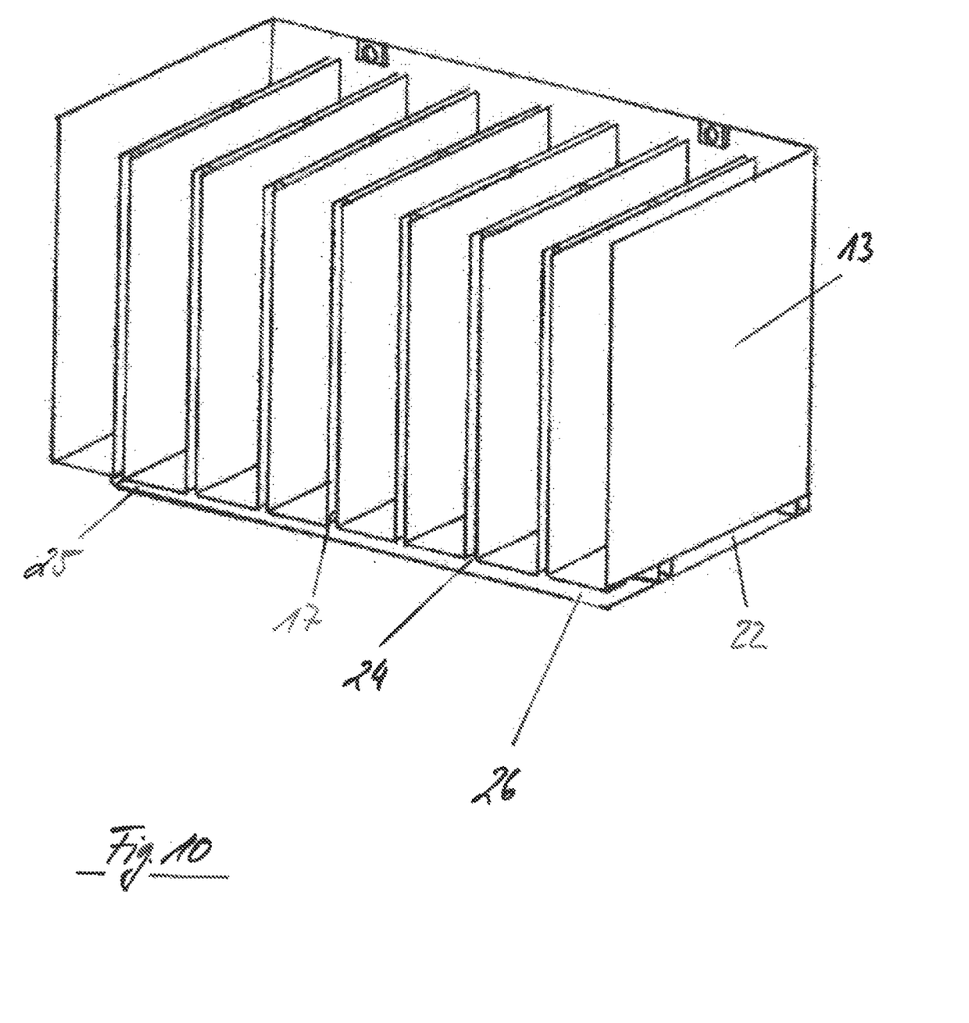
FIG. 10 shows a partially sectioned representation of the battery box shown in FIGS. 8 and 9.

FIGS. 8 through 10 show an embodiment according to the disclosure where the battery box 13 is provided with a gap space 22 on the bottom side in the area of bottom plate 16. For this purpose, it is again covered from below, so that gap space 22, which can be seen clearly in particular in FIG. 9, is formed.

Gap space 22, as can be seen from FIG. 10, is fluidically connected with the gap spaces 17 between the battery cells. That means that gap space 22 is open towards gap space 17 in region 24. To that extent, gap space 22 serves as a distribution gap space for all gap spaces 17. As can be seen in the exemplary embodiment, gap space 22 has a narrower flow cross-section on its end 25 than on the inlet end 26. This guarantees that all gap spaces 17 are generally uniformly supplied with cooling medium.

Figure 11:
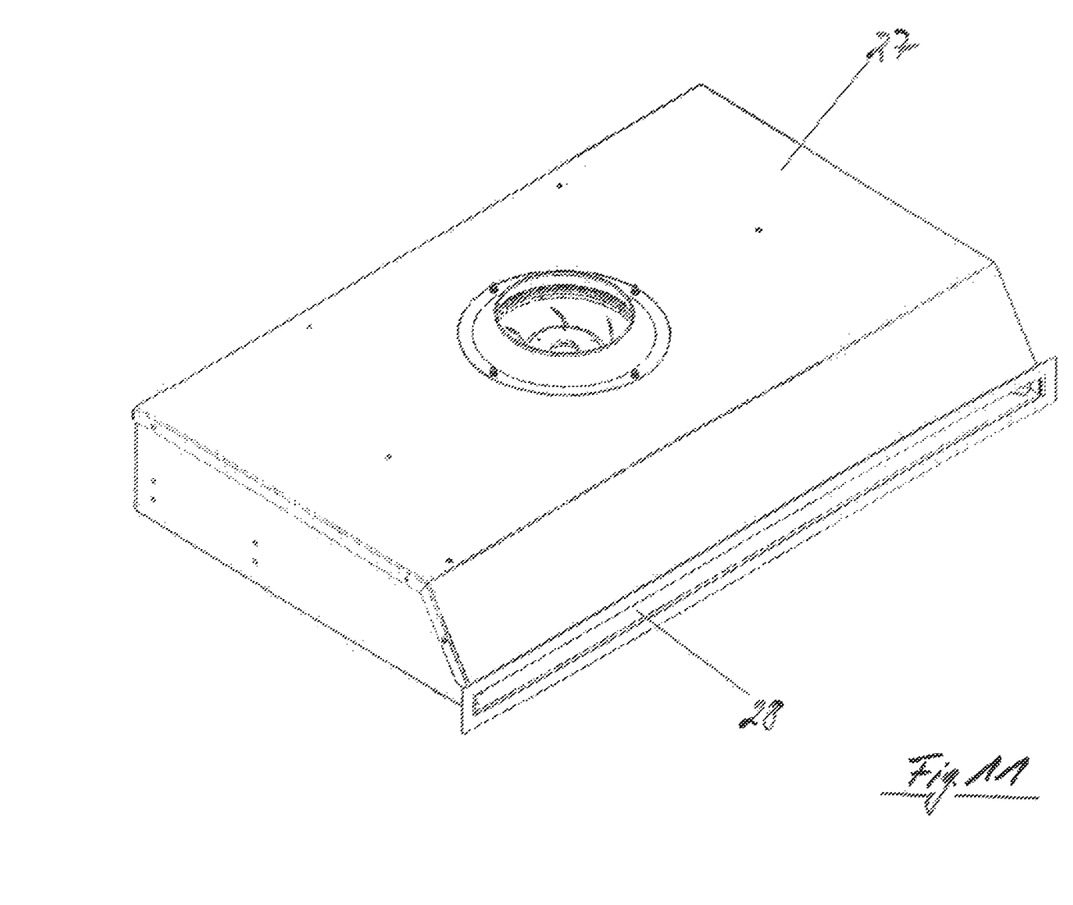
FIG. 11 shows a perspective representation of an external fan.

At the connection point of gap space 22 which connection point is closed at the other end 25, for instance a fan 27 as shown in FIG. 11 can be connected, so that gap space 22 is forcibly flown through via its outlet slot 28.

The described exemplary embodiment only serves a better understanding and is not restrictive.

The foregoing description of the embodiments has been provided for purposes of illustration and description. It is not intended to be exhaustive or to limit the disclosure. Individual elements or features of a particular embodiment are generally not limited to that particular embodiment, but, where applicable, are inter-changeable and can be used in a selected embodiment, even if not specifically shown or described. The same may also be varied in many ways. Such variations are to be regarded as a departure from the disclosure, and all such modifications are intended to be included within the scope of the disclosure.

The invention claimed is:

1. A traction battery, comprising a plurality of battery cells which are wired to one another and which each have positive and negative electrode plates arranged alternately with one another in a cell housing, and having a plurality of battery troughs, which each accommodate a plurality of battery cells in series, each battery trough is designed to be electrolyte-resistant and electrolyte-tight, and having a battery box accommodating the battery troughs, wherein adjacent battery troughs are arranged at a distance from one another, leaving a gap space, and wherein, underneath the battery troughs, a volume space is provided, which is in fluidic connection with the gap spaces and is used as a distribution gap space for all the gap spaces, and having a forcible flow system for a cooling medium, which has a means for generating a forcible flow, which is connected to the distributor gap space, for which purpose the distributor gap space has at the inlet end thereof a connection for a cooling medium feed line.

2. The traction battery according to claim 1, wherein the means for generating a forcible flow comprises at least one pump.

3. The traction battery according to claim 1, wherein the distribution gap space has different flow cross-sections in flow direction.

4. The traction battery according to claim 1, wherein the connection is slot-shaped.

5. The traction battery according to claim 1, wherein the cooling medium is air.

6. The traction battery according to claim 1, wherein the distribution gap space is delimited by a bottom plate arranged at a distance from the battery troughs.

7. The traction battery according to claim 6, wherein spacers are arranged between the battery troughs and the bottom plate.

8. The traction battery according to claim 7, wherein the spacers are webs extending transversely to the longitudinal orientation of the battery troughs.

9. The traction battery according to claim 1, wherein the distribution gap space comprises a flow cross-section which is continuously tapering from the inlet end to the opposite end.

10. The traction battery according to claim 1, wherein the means for generating a forcible flow comprises a fan.

11. The traction battery according to claim 10, wherein the fan comprises a housing.

12. The traction battery according to claim 11, wherein the housing comprises an outlet slot which is formed corresponding to the connection of the inlet end of the distributor gap space.

13. The traction battery according to claim 10, wherein the fan comprises a radial-flow impeller.

* * * * *